US 008041689B2

(12) United States Patent
Rowley (10) Patent No.: US 8,041,689 B2
(45) Date of Patent: Oct. 18, 2011

(54) FLEXIBLE LDAP TEMPLATES

(75) Inventor: Peter A. Rowley, Mountain View, CA (US)

(73) Assignee: Red Hat, Inc., Raleigh, NC (US)

( * ) Notice: Subject to any disclaimer, the term of this patent is extended or adjusted under 35 U.S.C. 154(b) by 323 days.

(21) Appl. No.: 11/607,559

(22) Filed: Nov. 30, 2006

(65) Prior Publication Data

US 2008/0133480 A1 Jun. 5, 2008

(51) Int. Cl.
G06F 7/00 (2006.01)
G06F 17/00 (2006.01)
(52) U.S. Cl. ........................................................ 707/694
(58) Field of Classification Search .............. 707/3, 779, 707/828, 694
See application file for complete search history.

(56) References Cited

U.S. PATENT DOCUMENTS

| | | | |
|---|---|---|---|
| 5,799,141 A | 8/1998 | Galipeau et al. | |
| 6,192,362 B1 * | 2/2001 | Schneck et al. | 1/1 |
| 6,339,827 B1 | 1/2002 | Stokes et al. | |
| 6,347,312 B1 | 2/2002 | Byrne et al. | |
| 6,418,441 B1 | 7/2002 | Call | |
| 6,470,354 B1 | 10/2002 | Aldridge et al. | |
| 6,651,070 B1 | 11/2003 | Hirashima et al. | |
| 6,715,128 B1 * | 3/2004 | Hirashima et al. | 715/209 |
| 6,947,953 B2 | 9/2005 | Herzenberg et al. | |
| 6,970,873 B2 * | 11/2005 | Fu et al. | 1/1 |
| 7,043,472 B2 | 5/2006 | Aridor et al. | |
| 7,209,970 B1 * | 4/2007 | Everson et al. | 709/229 |
| 7,444,594 B2 | 10/2008 | Abbott et al. | |
| 2003/0037044 A1 | 2/2003 | Boreham et al. | |
| 2003/0055917 A1 | 3/2003 | Boreham et al. | |
| 2003/0061347 A1 * | 3/2003 | Boreham et al. | 709/225 |
| 2003/0078937 A1 | 4/2003 | Boreham et al. | |
| 2003/0078995 A1 | 4/2003 | Boreham et al. | |
| 2003/0084069 A1 | 5/2003 | Boreham et al. | |
| 2003/0088656 A1 * | 5/2003 | Wahl et al. | 709/223 |
| 2003/0088678 A1 | 5/2003 | Boreham et al. | |
| 2003/0105733 A1 | 6/2003 | Boreham et al. | |
| 2003/0105742 A1 | 6/2003 | Boreham et al. | |
| 2003/0115196 A1 * | 6/2003 | Boreham et al. | 707/4 |
| 2003/0135491 A1 | 7/2003 | Rowley | |
| 2003/0191751 A1 | 10/2003 | Vora et al. | |
| 2004/0006557 A1 | 1/2004 | Baker et al. | |
| 2004/0267670 A1 | 12/2004 | Minyailov | |
| 2005/0021498 A1 * | 1/2005 | Boreham et al. | 707/1 |
| 2005/0060646 A1 | 3/2005 | Gauthier et al. | |
| 2005/0080792 A1 | 4/2005 | Ghatare | |
| 2005/0160090 A1 | 7/2005 | Harjanto | |
| 2005/0171958 A9 * | 8/2005 | Cheng et al. | 707/100 |
| 2005/0203897 A1 * | 9/2005 | Kapitskaia et al. | 707/3 |
| 2005/0216485 A1 | 9/2005 | Bell et al. | |
| 2005/0228794 A1 | 10/2005 | Navas et al. | |

(Continued)

OTHER PUBLICATIONS

Randy Urbano, Oracle® Database Advanced Replication, Dec. 2003, 10g Release 1 (10.1), Oracle Corporation, (342 pages).

(Continued)

Primary Examiner — Brent Stace
Assistant Examiner — Sabana Rahman
(74) Attorney, Agent, or Firm — Lowenstein Sandler PC (57) ABSTRACT

Template entries are added to a Lightweight Directory Access Protocol ("LDAP")-accessible database, containing attributes that affect new records added to the database, attributes returned in response to an LDAP query, and records identified through an LDAP search operation. Static and dynamic attributes are discussed.

18 Claims, 8 Drawing Sheets

U.S. PATENT DOCUMENTS

| | | |
|---|---|---|
| 2006/0122963 A1 | 6/2006 | Klein et al. |
| 2007/0016575 A1 | 1/2007 | Hurst-Hiller et al. |
| 2007/0149190 A1 | 6/2007 | Matsuhashi |
| 2007/0240050 A1 | 10/2007 | Quinn-Jacobs |
| 2008/0114770 A1 | 5/2008 | Chen et al. |

OTHER PUBLICATIONS

Red Hat Office Action for U.S. Appl. No. 11/706,011 mailed Jan. 22, 2010.

Red Hat Office Action for U.S. Appl. No. 11/656,579 mailed Apr. 27, 2009.

Red Hat Office Action for U.S. Appl. No. 11/656,579 mailed Apr. 28, 2010.

Red Hat Office Action for U.S. Appl. No. 11/656,579 mailed Dec. 9, 2008.

Red Hat Office Action for U.S. Appl. No. 11/656,579 mailed Sep. 24, 2009.

Red Hat Office Action for U.S. Appl. No. 11/703,310 mailed Dec. 18, 2008.

Red Hat Office Action for U.S. Appl. No. 11/703,310 mailed Mar. 2, 2010.

Red Hat Office Action for U.S. Appl. No. 11/703,310 mailed Oct. 28, 2009.

Red Hat Office Action for U.S. Appl. No. 11/703,310 mailed Aug. 18, 2010.

Red Hat Office Action for U.S. Appl. No. 11/706,011 mailed May 12, 2009.

Red Hat Office Action for U.S. Appl. No. 11/706,011 mailed May 26, 2010.

Red Hat Office Action for U.S. Appl. No. 11/706,011 mailed Sep. 1, 2009.

Red Hat Office Action for U.S. Appl. No. 11/706,011 mailed Dec. 22, 2010.

Red Hat Office Action for U.S. Appl. No. 11/706,011 mailed May 23, 2011.

* cited by examiner

FLEXIBLE LDAP TEMPLATES

FIELD

The invention relates to hierarchical database operations. In particular, the invention provides mechanisms to extend the capabilities of a Lightweight Directory Access Protocol ("LDAP") database.

BACKGROUND

The Lightweight Directory Access Protocol ("LDAP") is a standard computer networking protocol for querying and modifying entries in a database. The basic protocol is defined in a group of Internet Engineering Task Force ("IETF") Request for Comments ("RFC") documents; various aspects of the current version of the protocol (version 3) are described in RFCs listed in the "LDAP Technical Specification Road Map" (RFC4510, published June 2006). The databases reachable through LDAP may contain any sort of data, but most commonly contain identity and contact information for people and organizations.

LDAP presents a hierarchical view of the data in a database that is somewhat like the data in a file stored in a hierarchical filesystem. Each LDAP database record is associated with a Distinguished Name ("DN") that is like a fully-qualified path of a file. LDAP also deals with Relative Distinguished Names ("RDNs"), which are like partial paths that identify files starting from a location in a hierarchical filesystem other than the root directory. However, unlike data in "sibling" files in the same directory in a fileystem, "sibling" LDAP records often contain common data elements. (Sibling files can, of course, contain related data, but it is at least as likely that they do not.)

Unfortunately, common data elements in LDAP records are completely independent copies of each other. Thus, for example, even if two employees work at the same facility of an organization, the "address" fields of their records are independent, so if the facility is moved to a different location, each employee's LDAP record must be updated independently to show the new address. Alternate LDAP database operational techniques can reduce the effort required to make changes to groups of data records, and can help prevent errors that may occur when the same change is to be made to many records.

BRIEF DESCRIPTION OF DRAWINGS

Embodiments of the invention are illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

DETAILED DESCRIPTION

Embodiments of the invention operate on the server side of a Lightweight Directory Access Protocol ("LDAP") server-client system and build compatibly on standard LDAP functionality to provide new features that can be accessed by legacy and naïve clients.

Figure 1:
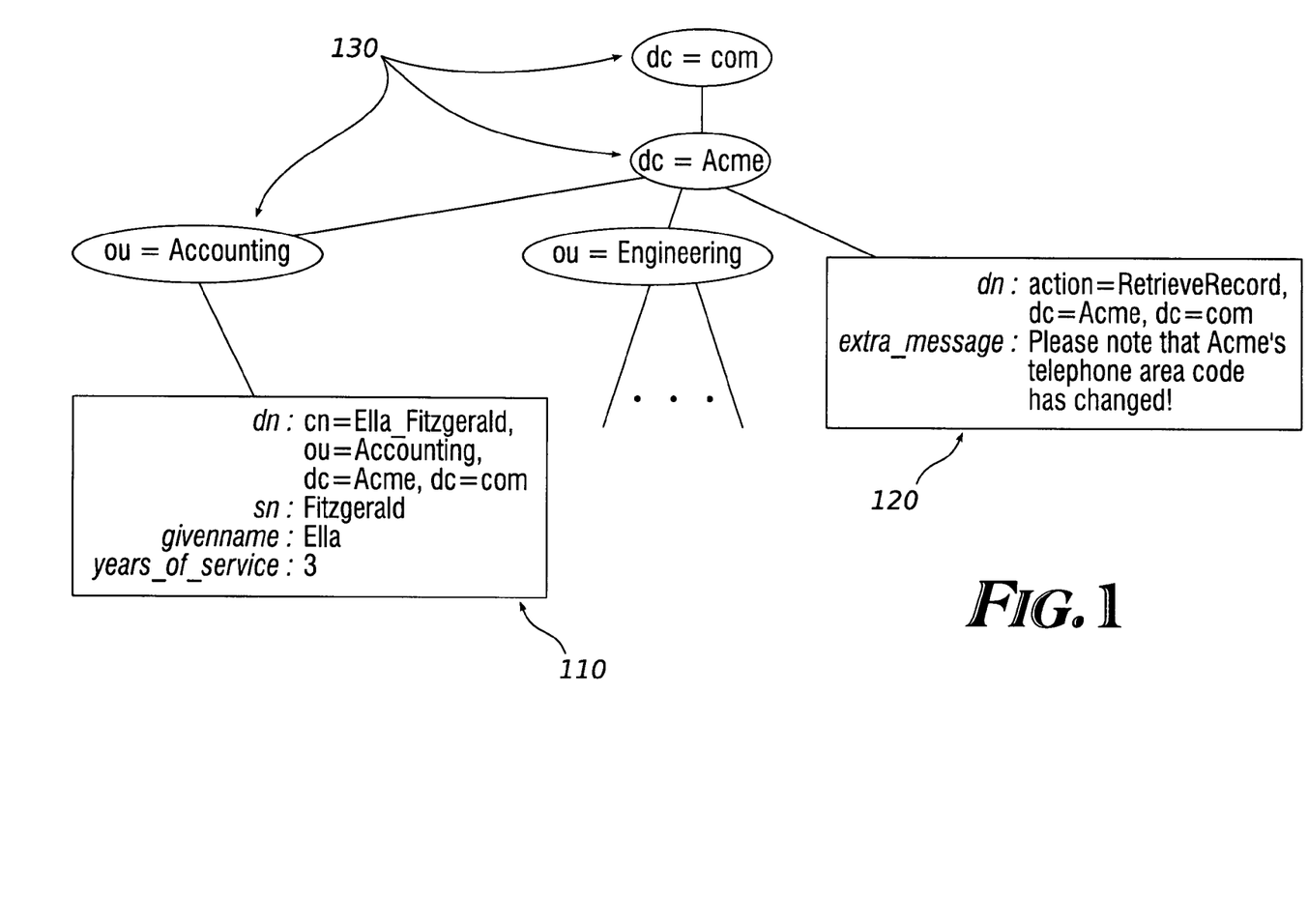
FIG. 1 shows a portion of an LDAP directory hierarchy, including an entry and a template according to an embodiment of the invention.

FIG. 1 shows a portion of an LDAP database hierarchy or "tree." Rectangular nodes 110, 120 indicate directory entries containing data or "attributes," while oval nodes 130 show the hierarchy of distinguished name ("DN") segments. (The underlying database need not directly implement the tree structure shown here; as long as a client can access the key/value attributes of an entry by providing the entry's DN, the database can support LDAP operations.) When an LDAP client queries the database to find a record identified by a DN, the server returns the attributes in the record (if such a record exists). When an LDAP client creates a new record, it transmits the attributes for the new record and the server stores it at an appropriate place.

An embodiment of the invention affects LDAP searching and record creation, modification and retrieval by placing attributes in entries elsewhere in the LDAP hierarchy (not at the location identified by the DN being created, modified or retrieved, nor necessarily "above" the affected entry in the hierarchy) and using those attributes to affect the results returned to the LDAP client.

Figure 2:
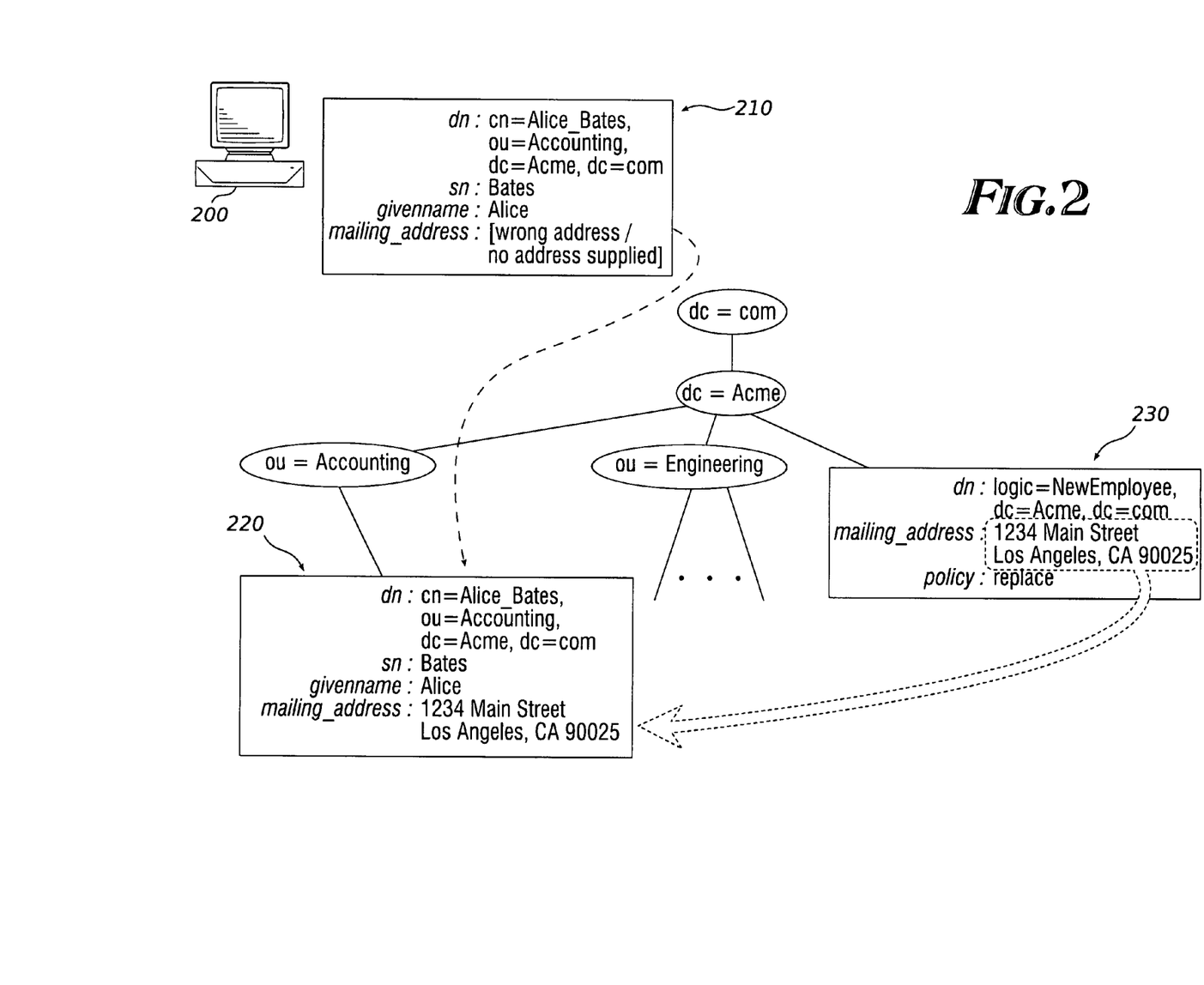
FIG. 2 shows how templates can be used to add static attributes to a new entry.
Figure 3:
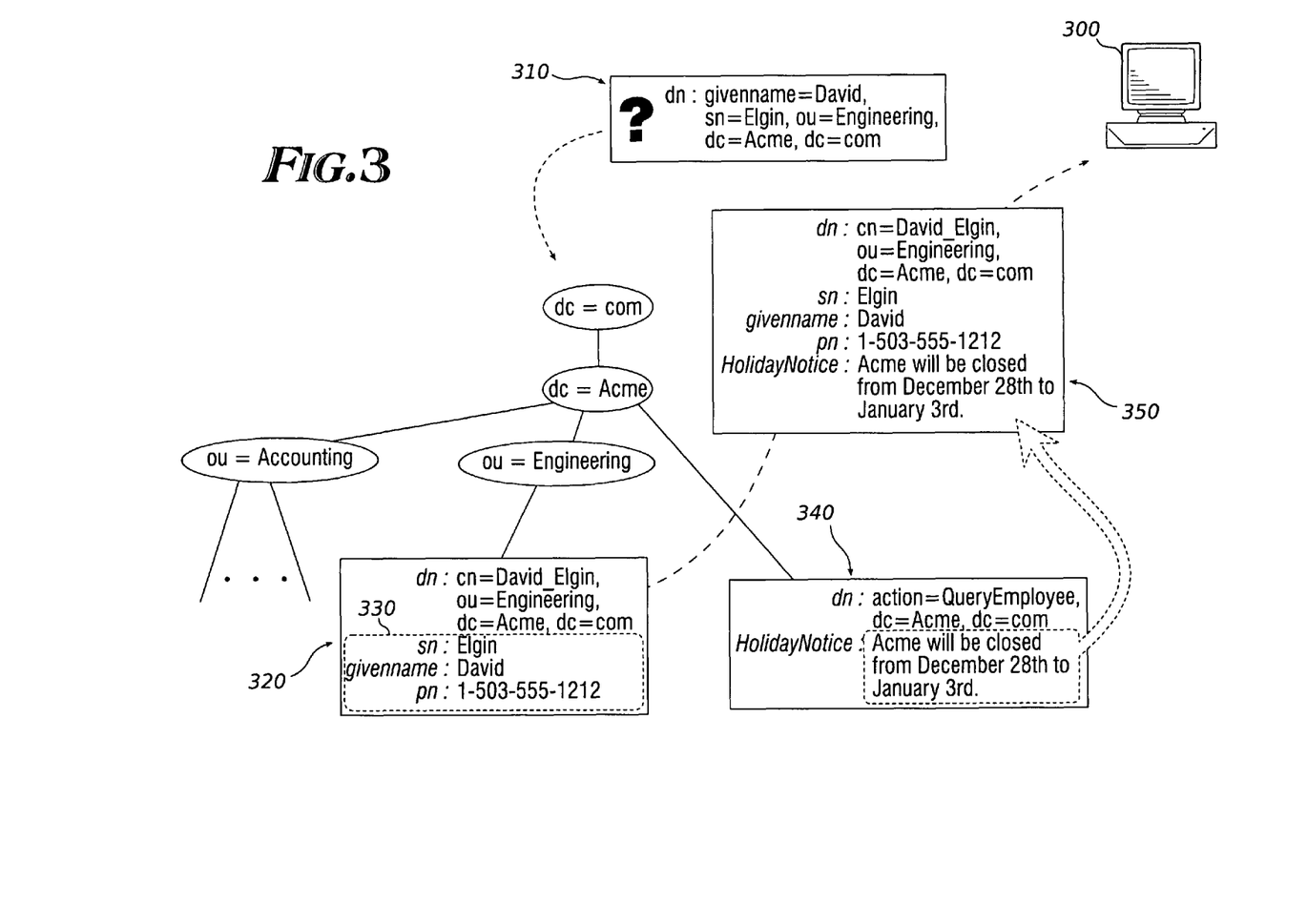
FIG. 3 shows how templates can be used to add dynamic attributes to a queried entry.
Figure 4:
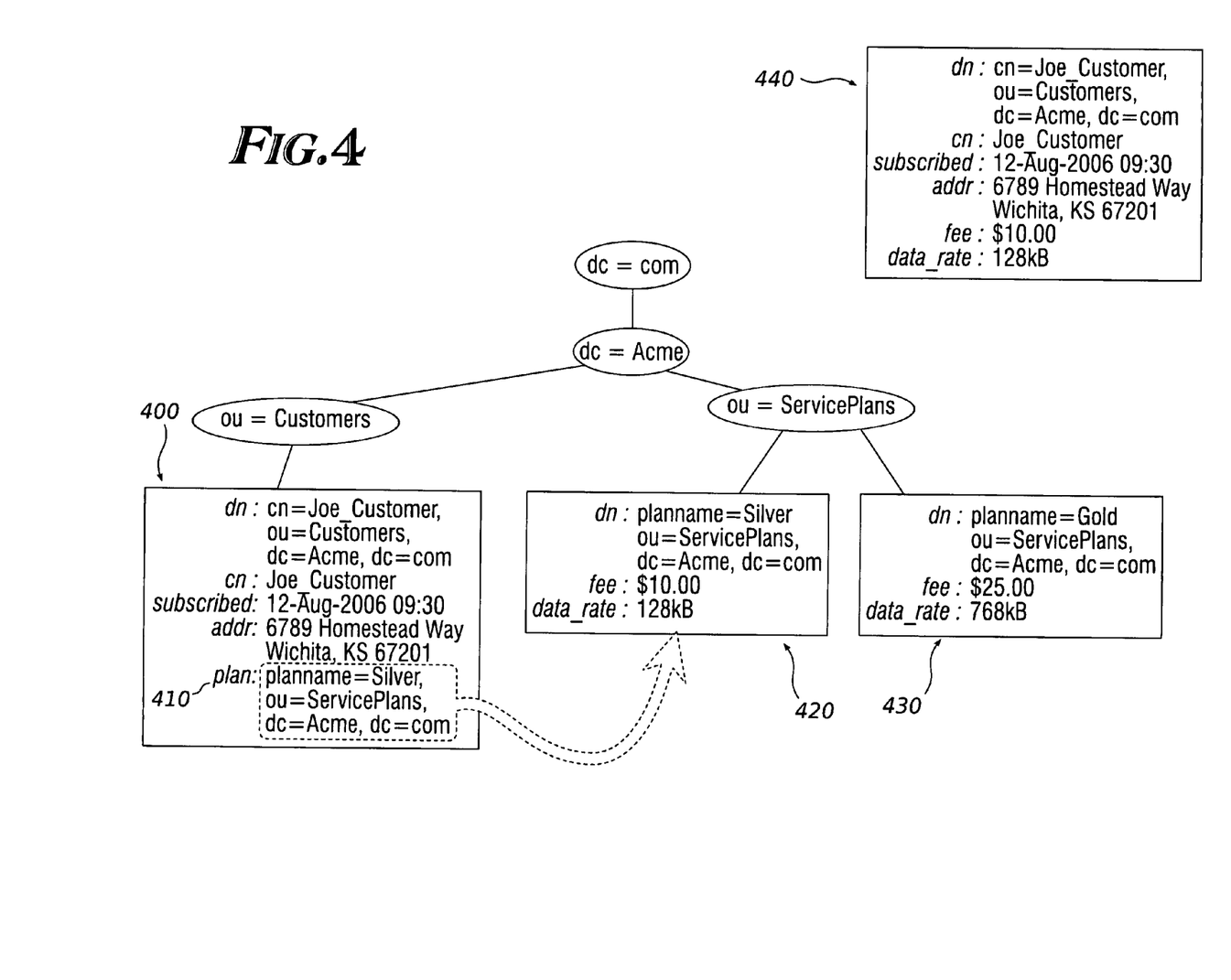
FIG. 4 shows an example of an indirect, dynamic template.

FIGS. 2-4 present several examples to show how LDAP database operations can be performed according to embodiments of the invention. In FIG. 2, client 200 creates a new record 210 for Alice Bates, who is an employee in the Accounting department of Acme company. The Distinguished Name for the new record is "*givenname*=Alice, *sn*=Bates, *ou*=Accounting, *dc*=Acme, *dc*=com". (The italicized portions of the DN are called object class identifiers. They are defined in an LDAP database schema, and stand for information such as "Given Name," "Surname," "Organizational Unit," and "Domain Component.")

The new record might contain an attribute for Alice's mailing address at Acme company, which the LDAP client would traditionally be responsible to determine and supply. However, an embodiment of the invention can reduce the client's workload and prevent errors by adhering to the convention that new records created within the "dc=Acme, dc=com" subtree be augmented with an attribute "MailingAddress=1234 Main Street, Los Angeles, Calif., 90025". Policy information to control whether the mailing address should be added only to new records that do not already have an address, or to all records (overriding any supplied address) can also be stored in an LDAP entry. In this example, the LDAP entry 230 at DN "action=CreateEmployee, dc=Acme, dc=com" includes the attribute "policy:replace", so the mailing address for new employees will always be set to the provided value before the employee's LDAP record 220 is saved. This functionality can be used to ensure that all new employee records contain certain attributes, even if the records are created through LDAP clients that are not aware of those attributes.

FIG. 3 shows an example of dynamically augmenting an LDAP entry requested by a client. Here, LDAP client 300 has transmitted a query 310 for a record identified as "givenname=David, sn=Elgin, ou=Engineering, dc=Acme, dc=com". The record 320 exists in the database, and the attributes shown at 330 would ordinarily be returned to the client. However, according to an embodiment of the invention, the record will first be augmented with attributes contained in the LDAP entry 340 at DN "action=QueryEmployee, dc=Acme, dc=com", so that the client will also receive the attribute "HolidayNotice:Acme will be closed from December 28$^{th}$ to January 3$^{rd}$" in the response 350. As this example shows, embodiments can be used to add "virtual" attributes to entries. The underlying entries need not be altered, so common attributes can be added and removed at will.

FIG. 4 shows an example where a customer's LDAP entry 400 includes an attribute 410 that references a template entry. The template entry 420 contains attributes that supplement the attributes in the main entry. The template describes the class of service to which the customer is entitled. If the customer upgrades his service plan, the ClassOfService attribute can be modified to contain the DN of a second template entry 430 containing different attributes describing the new plan. Queries for the customer's entry (using the customer's DN, for example) will return the attributes in the customer's entry and the attributes in the service plan 440. The ClassOfService attribute is called an "indirect" attribute, because it provides the DN of another entry. Indirect attributes may also provide relative directory names ("RDNs") to identify an entry located elsewhere in the LDAP hierarchy, where the location is specified with reference to the primary entry.

Figure 5:
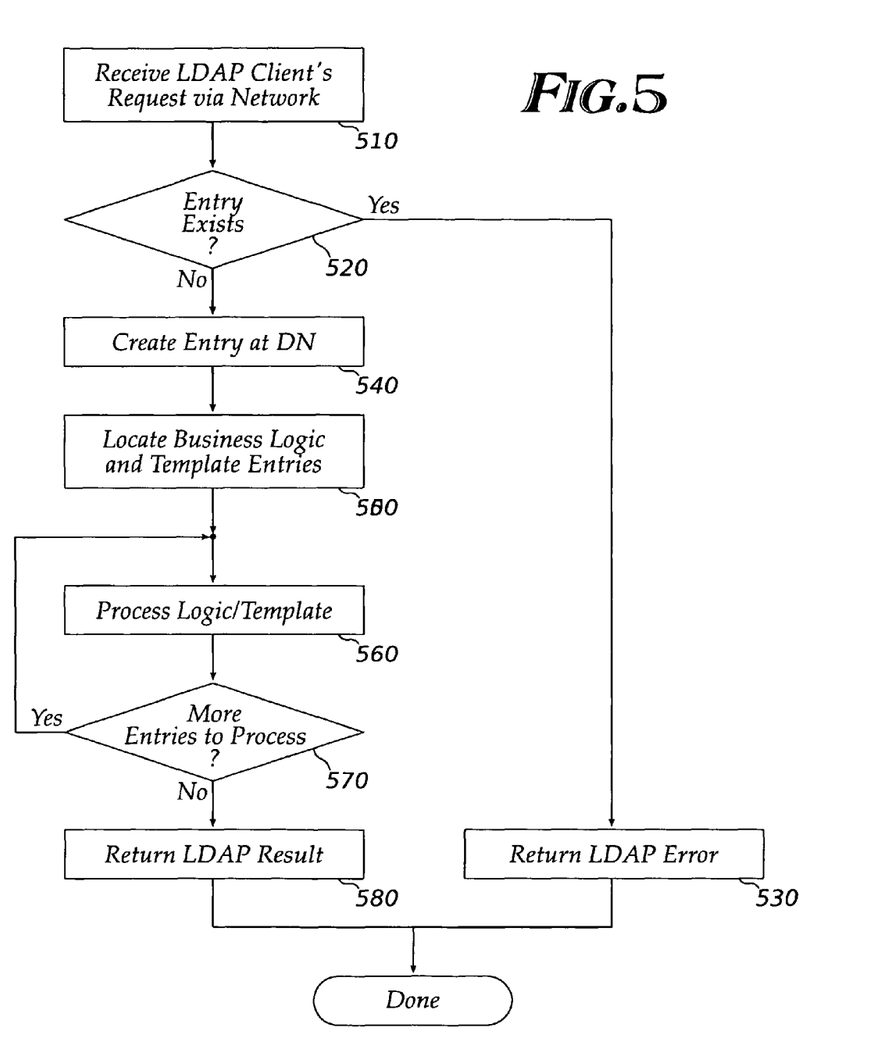
FIG. 5 outlines a method for creating new database entries.

The preceding examples illustrate several aspects of embodiments of the invention. FIG. 5 is a flow chart showing how an LDAP server can implement the functionality described when creating new records.

An LDAP server receives a request from a client via a network connection (510). The request contains a DN for which the client wishes to create an entry, and any attributes the client wishes to be stored in the entry. If an entry with the specified DN already exists (520), an LDAP error is returned (530). Otherwise, the server creates the entry (540), storing the attributes provided. Business logic entries and templates in the database are located (550) through a mechanism that is opaque to the LDAP client. In some embodiments, the entries may be stored in a separate portion of the directory tree. In other embodiments, entries may be stored at DNs between the new entry and the root of the tree. For example, when creating the record shown in FIG. 2, the LDAP server may attempt to retrieve entries at DNs "action=create, ou=Accounting, dc=Acme, dc=com" and "action=create, dc=Acme, dc=com" to find information about special procedures for creating new Accounting employees and/or about creating new Acme employees in general.

For each business logic and template entry found, the LDAP server processes the entry (560) and adjusts the new entry appropriately. For example, a template entry could provide attributes to augment or override data from the client, and a business logic entry could direct the LDAP server to launch an auxiliary process to set up a network account or email access. If there are more templates or logic entries to process (570), the LDAP server loops back to process them. Finally, an LDAP result is returned to the client (580), informing the client whether the entry creation succeeded.

Figure 6:
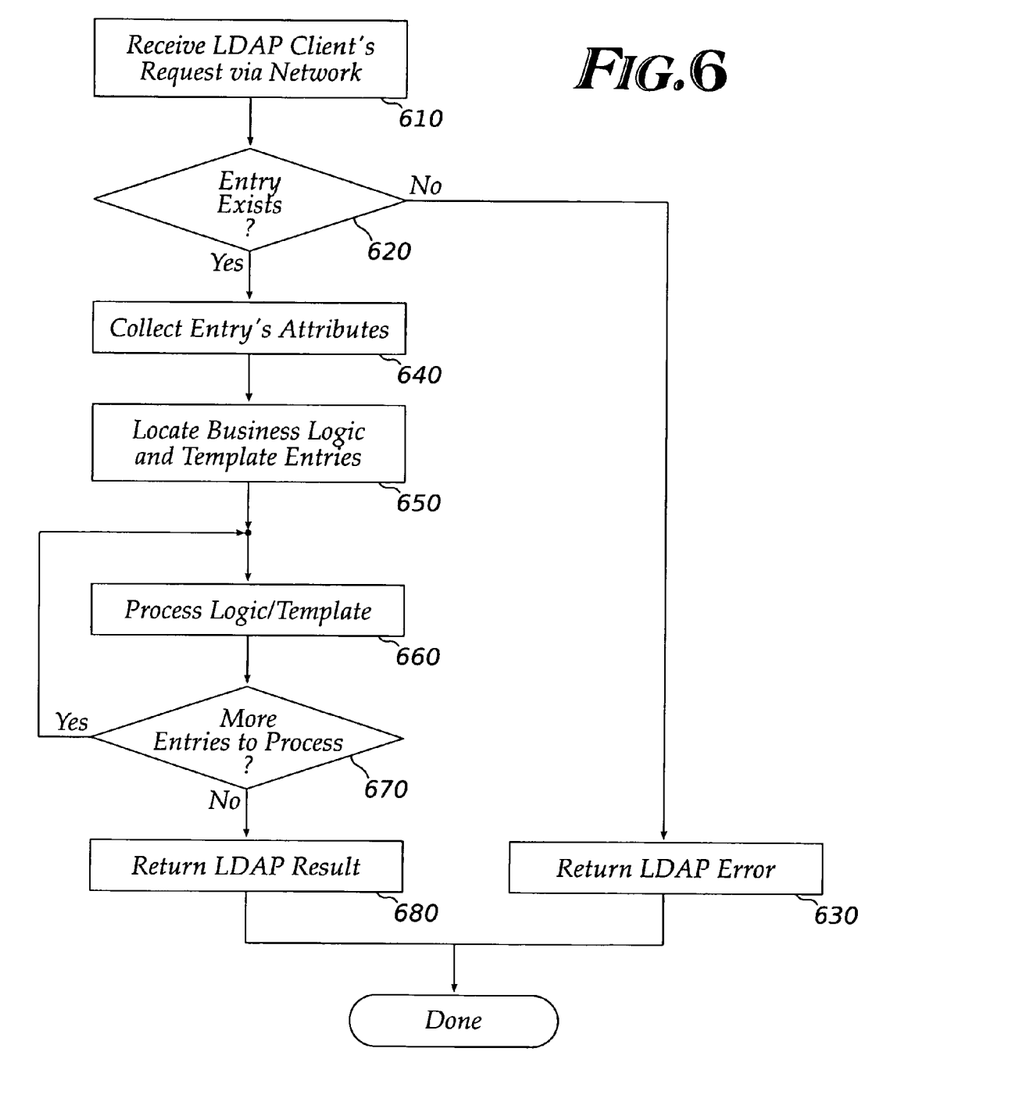
FIG. 6 outlines a method for retrieving or modifying an existing database entry.

FIG. 6 shows how an LDAP server can retrieve or modify an entry that a client has requested by its DN. As before, the LDAP server receives a request from a client via a network connection (610). This request contains the DN and (if it is a "modify" request) some attributes that are to be changed, if the server cannot locate the entry (620), an error is returned (630). Otherwise, the entry's attributes are collected (640) and the server looks for templates and business logic entries that should be processed in connection with the retrieve or modify request (650). These templates and logic entries may be stored in the LDAP database as described above. For example, entries with DNs of "action=retrieve, ou=Engineering, dc=Acme, dc=com" or "action=modify, dc=Acme, dc=com" might contain attributes to cause the LDAP server to perform automatic adjustments to the primary entry's attributes before committing the changes or returning the entry. Each template or logic entry is processed (660), and if there are more entries (670), they are processed in turn. Finally, an LDAP response is returned to the client (680).

The methods outlined with reference to FIGS. 5 and 6, and the examples of FIGS. 2 and 3, implicitly show two different operational styles that are contemplated by embodiments of the invention. The first can be described as "static," when an attribute (such as the mailing address) is automatically added to a newly-created entry, and is thereafter treated as an ordinary attribute of the entry that could be changed or deleted (assuming no other logic or template prevents this). The second operational style can be described as "dynamic," where some attributes are not actually a part of an entry, but are automatically added to an LDAP response when the entry is requested or retrieved. There may be only a single copy of dynamic attributes in the database, so every entry that references the dynamic attribute can be updated consistently and at once by changing the common copy of the attribute. Embodiments can process an attribute in a template as a flag that indicates whether the template's attributes are static or dynamic.

Searching for entries containing attributes that match attributes provided by a client is more involved in an LDAP database that supports template and business logic functions than in a standard LDAP database because entries may not contain all the attributes that would be returned if the entry was requested by its DN. (Dynamic attributes may be added or changed automatically before the entry is returned, as described above.) To support searching, an LDAP server operating according to an embodiment of the invention can proceed as outlined in FIG. 7.

Figure 7:
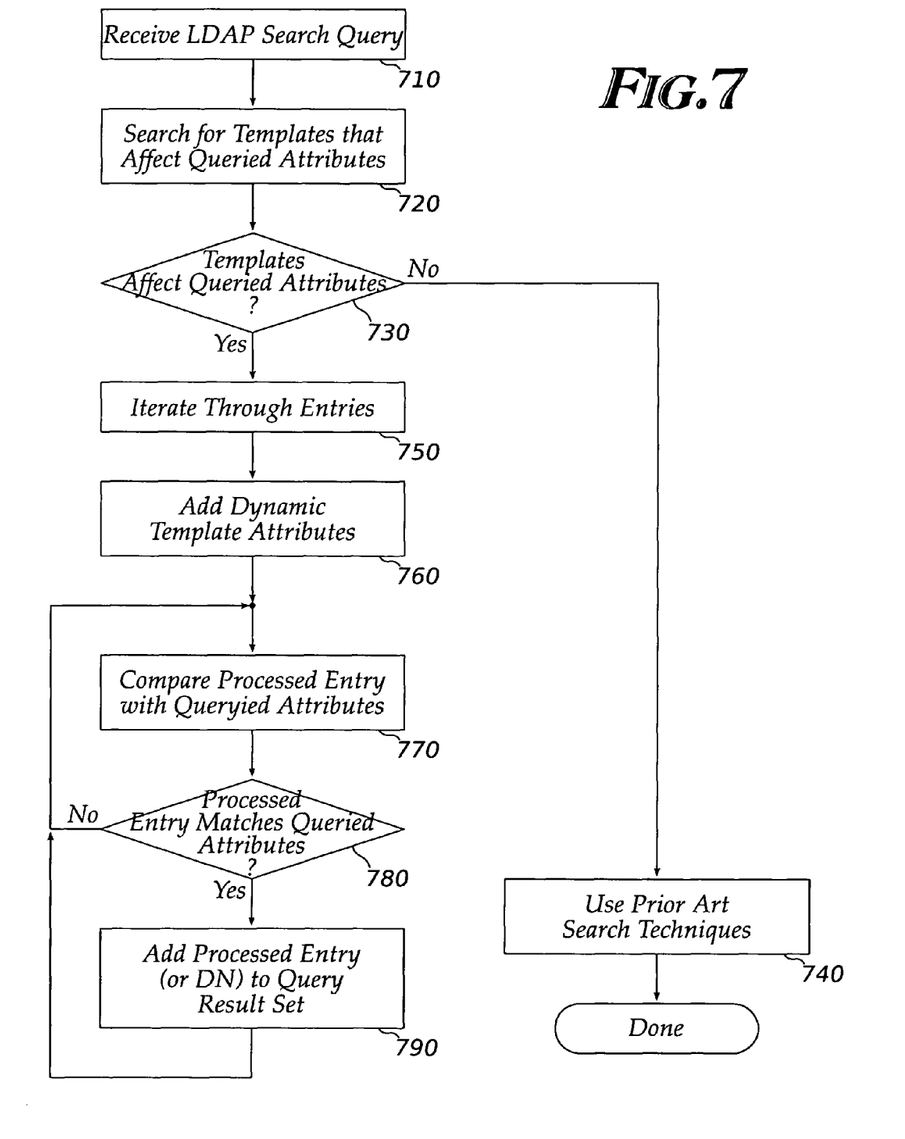
FIG. 7 outlines a method for querying the database to find matching entries.

The LDAP server receives a search query from an LDAP client via a network connection (710). The query contains attributes to be matched, and the client wishes to receive DNs of any entries containing matching attributes. Query attributes may be conjunctive or disjunctive ("match any" or "match all").

The server searches internally for template and logic entries that affect attributes whose keys correspond to attributes in the query (720). If no such templates or logic entries are found (730), the search can be processed according to prior-art methods (740).

Next, the server iterates through database entries (750), processing each entry as described with reference to FIG. 6 to add any dynamic, virtual attributes (760). The processed entry's attributes are compared to the query attributes (770). If the processed entry matches the query (780), the processed entry (or the entry's DN) is returned to the client (790).

Figure 8:
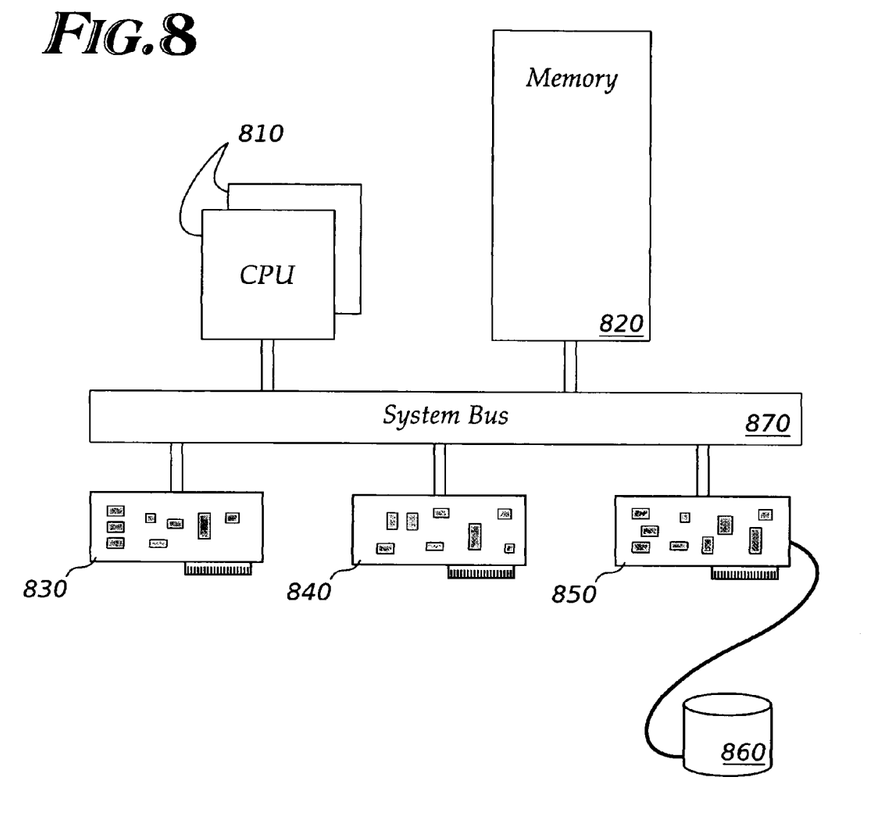
FIG. 8 shows a some components of a computer system that can implement an embodiment of the invention.

FIG. 8 shows some components and subsystems of a computer system that can implement some of the methods of embodiments of the invention. One or more programmable processors ("central processing units" or "CPUs") 810 execute instructions contained in memory 820 to perform methods according to an embodiment. Memory 820 may also contain data upon which the instructions operate. For example, LDAP requests, responses, entries and templates located in the database, and dynamically-generated entries (augmented with template information) may be held in memory 820 at various times. A network interface 830 permits the system to communicate with its peers and exchange data as described above. A mass storage interface 850 permits the system to store and retrieve information on a computer-readable medium 860. System bus 870 connects these components and carries control signals and data between them.

An embodiment of the invention may be a machine-readable medium having stored thereon instructions to cause a programmable processor to perform operations as described above. In other embodiments, the operations might be performed by specific hardware components that contain hard-wired logic. Those operations might alternatively be performed by any combination of programmed computer components and custom hardware components.

Instructions for a programmable processor may be stored in a form that is directly executable by the processor ("object" or "executable" form), or the instructions may be stored in a human-readable text form called "source code" that can be automatically processed by a development tool commonly known as a "compiler" to produce executable code. Instructions may also be specified as a difference or "delta" from a predetermined version of a basic source code. The delta (also called a "patch") can be used to prepare instructions to implement an embodiment of the invention, starting with a commonly-available source code package that does not contain an embodiment.

In the preceding description, numerous details were set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions were presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "processing" or "computing" or "calculating" or "determining" or "displaying" or the like, refer to the action and processes of a computer system or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, compact disc read-only memory ("CD-ROM"), and magnetic-optical disks, read-only memories (ROMs), random access memories (RAMs), eraseable, programmable read-only memories ("EPROMs"), electrically-eraseable read-only memories ("EEPROMs"), magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes a machine readable storage medium (e.g., read only memory ("ROM"), random access memory ("RAM"), magnetic disk storage media, optical storage media, flash memory devices, etc.), a machine readable transmission medium (electrical, optical, acoustical or other form of propagated signals (e.g., carrier waves, infrared signals, digital signals, etc.)), etc.

The applications of the present invention have been described largely by reference to specific examples and in terms of particular allocations of functionality to certain hardware and/or software components. However, those of skill in the art will recognize that flexible LDAP templates can also be implemented by software and hardware that distribute the functions of embodiments of this invention differently than herein described. Such variations and implementations are understood to be captured according to the following claims.

I claim:

1. A method comprising:

receiving a request through a network connection to create a new entry in a database, wherein the request includes a distinguished name ("DN") associated with the new entry to be created and at least one attribute to be stored in the new entry;

creating the new entry based on the at least one attribute from the request;

locating a template entry in the database associated with the new entry request, the template entry including a policy attribute and at least one static attribute, the policy attribute specifying whether a server is to at least one of: augment the new entry with the static attribute and override data that is supplied by a client in the new entry with the static attribute;

examining the policy attribute in the template entry to determine whether the server is to at least one of: augment the new entry and override the data in the new entry;

adding the static attribute to the new entry based on the policy attribute specifying that the server is to augment the new entry and replacing the data that is supplied by the client in the new entry with the static attribute from the template entry based on the policy attribute specifying that the server is to override the data in the new entry, wherein adding the static attribute to the new entry and replacing the data in the new entry form a plurality of attributes for the new entry; and associating the plurality of attributes with the DN in the database in order to finalize creation of the new entry.

2. The method of claim 1 wherein the request is a Lightweight Directory Access protocol ("LDAP") request.

3. The method of claim 1 wherein locating comprises:
searching for the template entry in a portion of a directory tree that contains at least one template entry.

4. The method of claim 1 wherein adding the static attribute overrides an attribute of the request having an identical object class identifier.

5. The method of claim 1 wherein locating comprises:
searching for the template entry in entries between the DN and a root of a directory tree.

6. The method of claim 1 wherein the type of request includes a request to create a new entry in a LDAP directory server, a request to query an existing entry in the LDAP directory server, or a request to modify the existing entry in the LDAP directory server.

7. A system comprising:
a memory; and
a processor coupled to the memory to
receive a request through a network connection to create a new entry in a database, wherein the request includes a distinguished name ("DN") associated with the new entry to be created and at least one attribute to be stored in the new entry;
create the new entry based on the at least one attribute from the request;
locate a template entry in the database associated with the new entry request, the template entry including a policy attribute and at least one static attribute, the policy attribute specifying whether a server is to at least one of: augment the new entry with the static attribute and override data that is supplied by a client in the new entry with the static attribute;
examine the policy attribute in the template entry to determine whether the server is to at least one of: augment the new entry and override the data in the new entry;
add the static attribute to the new entry based on the policy attribute specifying that the server is to augment the new entry and replacing the data that is supplied by the client in the new entry with the static attribute from the template entry based on the policy attribute specifying that the server is to override the data in the new entry, wherein adding the static attribute to the new entry and replacing the data in the new entry form a plurality of attributes for the new entry; and
associate the plurality of attributes with the DN in the database in order to finalize creation of the new entry.

8. The system of claim 7, wherein the request is a Lightweight Directory Access protocol ("LDAP") request.

9. The system of claim 7, wherein the processing device is to locate a template entry by:
searching for the template entry in a portion of a directory tree that contains at least one template entry.

10. The system of claim 7, wherein the processing device to add the static attribute overrides an attribute of the request having an identical object class identifier.

11. The system of claim 7, wherein the processing device is to locate a template entry by:
searching for the template entry in entries between the DN and a root of a directory tree.

12. The system of claim 7, wherein the type of request includes a request to create a new entry in a LDAP directory server, a request to query an existing entry in the LDAP directory server, or a request to modify the existing entry in the LDAP directory server.

13. A non-transitory computer-readable storage medium including instructions that, when executed by a computer system, causes the computer system to perform a set of operations comprising:
receiving a request through a network connection to create a new entry in a database, wherein the request includes a distinguished name ("DN") associated with the new entry to be created and at least one attribute to be stored in the new entry;
creating the new entry based on the at least one attribute from the request;
locating a template entry in the database associated with the new entry request, the template entry including a policy attribute and at least one static attribute, the policy attribute specifying whether a server is to at least one of: augment the new entry with the static attribute and override data that is supplied by a client in the new entry with the static attribute;
examining the policy attribute in the template entry to determine whether the server is to at least one of: augment the new entry and override the data in the new entry;
adding the static attribute to the new entry based on the policy attribute specifying that the server is to augment the new entry and replacing the data that is supplied by the client in the new entry with the static attribute from the template entry based on the policy attribute specifying that the server is to override the data in the new entry, wherein adding the static attribute to the new entry and replacing the data in the new entry form a plurality of attributes for the new entry; and
associating the plurality of attributes with the DN in the database in order to finalize creation of the new entry.

14. The non-transitory computer-readable storage medium of claim 13, wherein the request is a Lightweight Directory Access protocol ("LDAP") request.

15. The non-transitory computer-readable storage medium of claim 13, wherein locating comprises:
searching for the template entry in a portion of a directory tree that contains at least one template entry.

16. The non-transitory computer-readable storage medium of claim 13, wherein adding the static attribute overrides an attribute of the request having an identical object class identifier.

17. The non-transitory computer-readable storage medium of claim 13, wherein locating comprises:
searching for the template entry in entries between the DN and a root of a directory tree.

18. The non-transitory computer-readable storage medium of claim 13, wherein the type of request includes a request to create a new entry in a LDAP directory server, a request to query an existing entry in the LDAP directory server, or a request to modify the existing entry in the LDAP directory server.

* * * * *